United States Patent [19]
Sidles

[11] 3,947,979
[45] Apr. 6, 1976

[54] MUD RESISTANT ELASTOMER
[75] Inventor: James Sidles, Richfield, Ohio
[73] Assignee: The B. F. Goodrich Company, Akron, Ohio
[22] Filed: Aug. 23, 1971
[21] Appl. No.: 173,883

[52] U.S. Cl. ............................. 36/32 R; 36/59 C
[51] Int. Cl.² ................................. A43B 13/04
[58] Field of Search ........... 36/32 R, 59 C, 59 R; D2/319, 320, 321, 322; 152/209 D

[56] References Cited
UNITED STATES PATENTS

| | | | |
|---|---|---|---|
| 485,459 | 11/1892 | Crocker | 36/59 C |
| 2,155,166 | 4/1939 | Kraft | 36/59 C |
| 2,710,461 | 6/1955 | Hack | 36/59 C X |
| 2,833,057 | 5/1958 | Hack | 36/59 C |
| 2,930,149 | 3/1960 | Hack et al. | 36/32 R X |
| 3,114,981 | 12/1963 | Murawski | 36/32 R X |
| 3,507,059 | 4/1970 | Vietas | 36/59 C |

FOREIGN PATENTS OR APPLICATIONS

| | | | |
|---|---|---|---|
| 1,225,328 | 2/1960 | France | 36/32 R |

*Primary Examiner*—Alfred R. Guest
*Attorney, Agent, or Firm*—Joseph Januszkiewicz; W. A. Shira, Jr.

[57] ABSTRACT

A sole and heel construction such as used on overshoes, boots or shoes having a resilient planar body with a plurality of spaced thin fins that extend transversely across the body. The fins are evenly spaced and uniform in width throughout. All fins are identical and are inclined relative to a horizontal plane such that any weight applied to the sole compresses the fins to trap air between adjacent fins to minimize mud build-up.

8 Claims, 6 Drawing Figures

U.S. Patent    April 6, 1976    Sheet 1 of 2    3,947,979
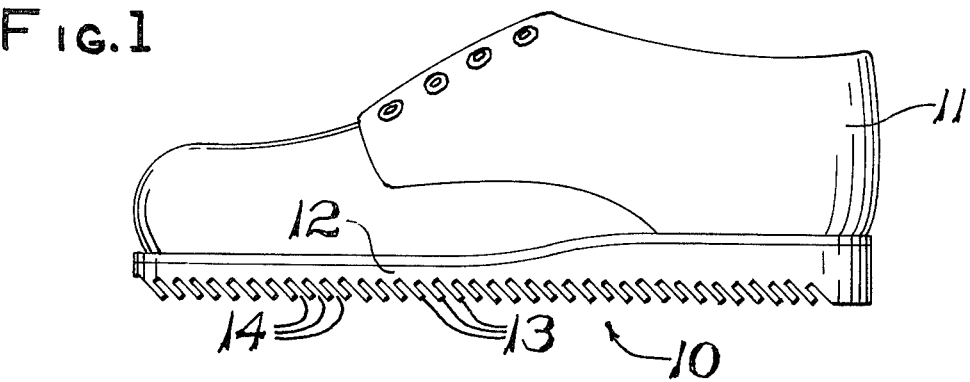
Fig.1
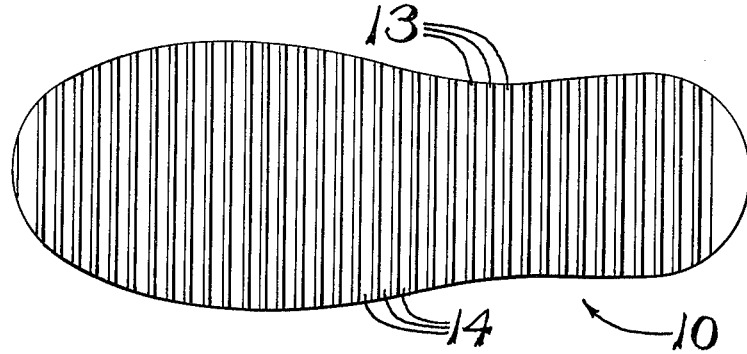
Fig.2
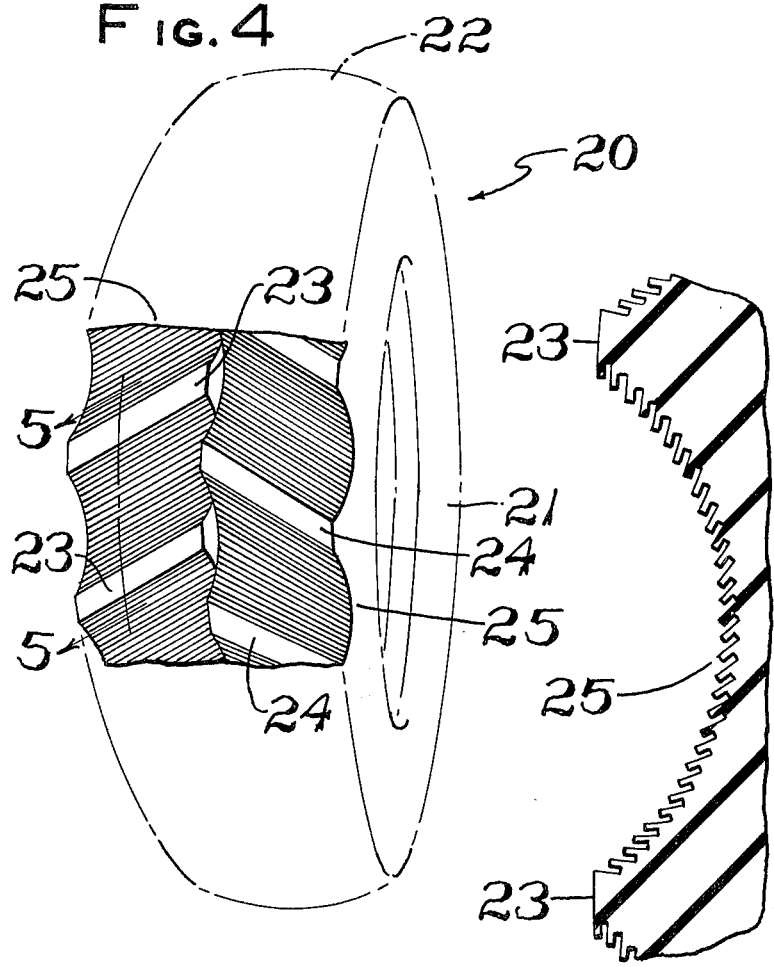
Fig.4
Fig.5
INVENTOR.
JAMES SIDLES
BY Joseph Januszkiewicz
ATTY.

MUD RESISTANT ELASTOMER

BACKGROUND OF THE INVENTION

This invention relates to a molded, resilient self cleaning piece of rubber and more particularly to a new and improved molded rubber sole which has a novel action of trapping air to clean itself when used in the environment of mud.

It has been known to construct shoe soles and heels of resilient deformable materials such as rubber, flexible plastics and other suitable compositions which have a plurality of transversely arranged corrugated ribs, undulations which project downwardly from and formed integrally with an upper section that is secured to the base portion of a shoe. The ribs generally project rearwardly from the front or toe section of the shoe towards the rear or heel portion and are inclined downwardly when viewed in side elevation on a shoe. Such ribs in shoe construction have been confined to the general use of facilitating the walking action or to ease the wearer's comfort in standing. The variations in construction of such deformable ribs has been claimed to increase resiliency and the forward gliding action imparted to the wearer's feet during walking or running.

The sole construction of the present invention which is particularly adaptable to overshoes is a completely new concept over such corrugated ribs by providing a plurality of transversely extending flexible fins that are thinner in construction and even in spacing and of such length that they trap air between adjacent fins upon deflection such that they spring back into original shape and will clean themselves if such fins come in contact with mud. The preferred form of the invention is to have a plurality of fins disposed at approximately 45° angle with respect to the horizontal plane and with the spaces between the fins being of a width that is equal to the width or thickness of the fins, and the height of the fins being equal to the depth of the space that is defined by pairs of adjacent fins. The fins are flexible such that the normal walking action of the overshoe will compress the fins in the sole to effect a trapping action of the air to clean the mud that is encountered on the lower most surface.

Such invention is applicable to tires and other rubber products wherein they inhibit the build-up of mud and their use in such an environment. The present invention is especially applicable to tires such as farm, tractor tires, and military vehicle tires that have a plurality of circumferentially spaced ribs or lugs with a relatively smooth valley area therebetween. The valley areas are either molded or contoured to have the mud inhibiting fin construction which eliminates mud pickup and mud build-up.

SUMMARY OF THE INVENTION

This invention relates to sole construction such as used on overshoes, boots, or shoes wherein the sole has a resilient body that is adapted to be fixedly secured to the base of the shoe or an integral part of it as constructed. The sole has a plurality of transversely extending fins, which fins slant downwardly from the resilient body and in a generally rearwardly direction, namely from the toe section towards the heel. Each fin's front and rear slanting surfaces are parallel with all fins being of uniform thickness throughout. The groove between adjacent fins are equal in width and depth, cooperating with the fins on their deflection to trap air to facilitate the self-cleaning feature such that the sole of overshoes clean the mud therefrom. This invention is applicable to other uses that remove mud from their operating surfaces as in mud from tire surfaces.

BRIEF DESCRIPTION OF THE DRAWINGS

FIG. 1 is a side elevational view of a shoe provided with a sole construction embodying the principles of the present invention.

FIG. 2 is a bottom view of the sole construction illustrated in FIG. 1.

FIG. 4 is a perspective view of a tractor tire showing the entire tire in phantom lines and a section broken away portion showing the conventional ribs with portions therebetween constructed in accordance with the principles of the present invention.

FIG. 5 is an enlarged cross-sectional view of the tractor tire taken on lines 5—5 of FIG. 4.

DETAILED DESCRIPTION

Figure 6:
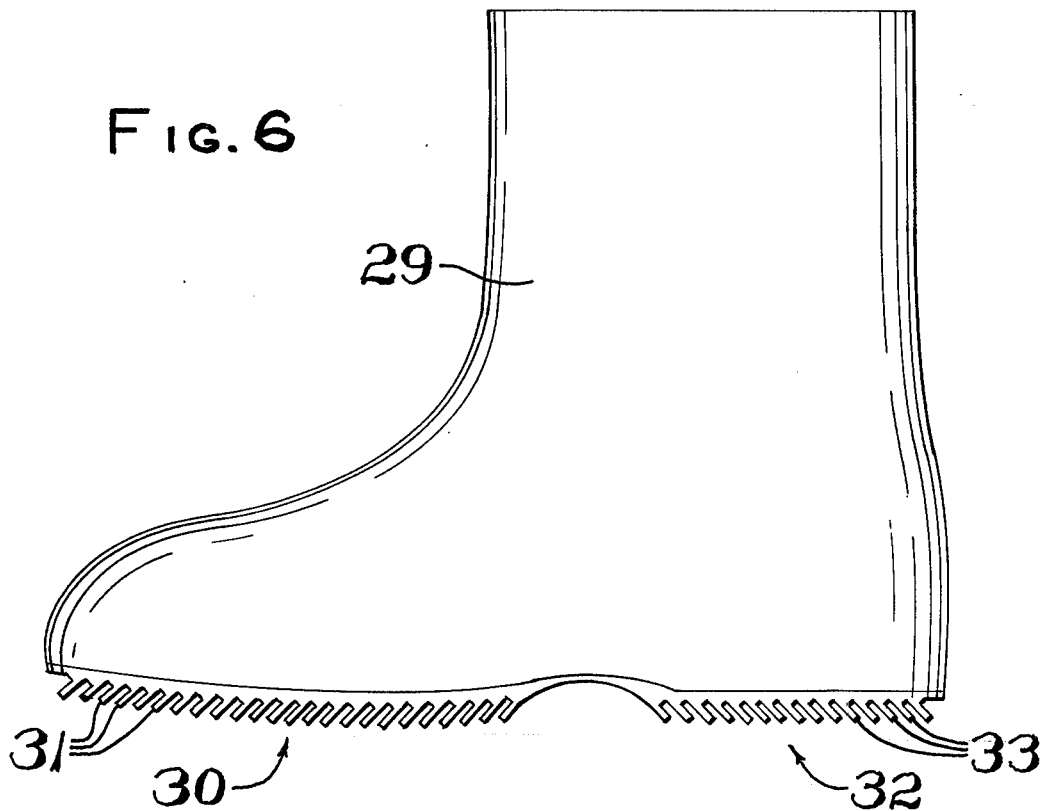
FIG. 6 is side elevational view of the lower portion of boot showing a modified form of sole and heel construction.

Referring to the drawings wherein like reference characters designate like or corresponding parts throughout the several views, there is shown in FIG. 1 a shoe sole and heel construction 10 made in accordance with the present invention, which sole and heel are shown as a single integral unit attached and part of a shoe 11. It is to be understood that this sole construction is particularly adaptable to an overshoe or boot construction which encounters mud; however, for simplicity of illustration, FIG. 1 discloses the sole as part of a shoe 11. The term "sole" as hereinafter used unless otherwise designated covers the entire undersurface of the shoe 11 and includes the heel portion. The sole's forward portion would be the toe portion and the sole's rearward portion would be considered the outermost heel portion. The sole 10 includes a solid planar portion 12 that is generally horizontally disposed having a plurality of downward and reawardly extending fins 13. The fins 13 extend transversely across the sole defining grooves 14 between adjacent pairs of fins 13. Each fin 13 is of the same uniform thickness $a$ throughout its height designated $b$ in FIG. 3. The fins extend downwardly and rearwardly from the planar portion 12, with each fin having a front surface portion 15 and a rear surface portion 16. All the front and rear surfaces 15 and 16 of the fins 13 are parallel and disposed at approximately 45° with respect to the horizontal. When considering the height of the fins, the measurement along the front surface may be designated $b$ (FIG. 3) whereas the measurement along the rear surface may be designated $c$. For simplicity of understanding the height will be understood to be represented by measurement $c$. The depth of the grooves 14 may also be designated $c$, which dimension is the same as the height of the fins 13. The length of the fins 13 and the grooves 14 are determined by the width of the sole as viewed in plan of FIG. 2. The base 17 of the respective fins 13 cooperate with the grooves 14 to trap air to facilitate the self cleaning action of the sole.

Figure 3:
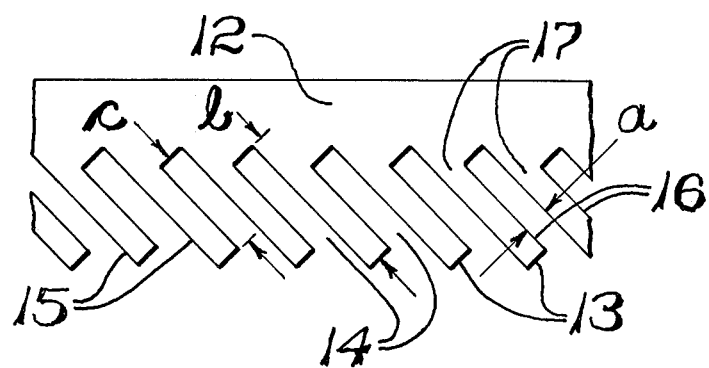
FIG. 3 is an enlarged fragmentary side elevational view of a portion of the sole construction of FIG. 1, showing the construction five times its normal size.

The operation of the sole in the environment of mud, as where an individual uses shoes or an overshoe with the sole constructed in accordance with the above described structure, is such that in walking the fins 13 yield as they are pressed into the mud, trapping air at the base of the fins. As the sole is raised out of the mud surface the air acts to break up the suction that would ordinarily exist. The sides of the fins would open and allow the air to flow into the groove and facilitate the peeling off and breaking off of the mud. The precise action of the fins and phenomenon occurring is not fully understood, however, tests made of such surfaces in use have shown that because of the above described sole construction, boots and overshoes reduce the amount of mud picked up by up to 90 percent in weight, compared with boots having conventional soles. As an example of the dimension depicted by FIG. 3, dimension $a$ which is the width of the groove 14 as well as the thickness of the fin is 0.035 while the depth of the groove 14, or height of the fin 13, dimension c, along its rear surface is 0.15, inch, and the height of the fin 13 along its forward face 15 which is dimension b is 0.23. inch. FIG. 3 illustrates the size of the fins 13 and grooves 14 magnified approximately five times the actual size.

The fin structure in FIG. 1 is larger than actually proportioned; however, such sole construction in FIG. 1 is shown to illustrate the general overall structure in use. The proportions are shown in FIG. 3 wherein the size is magnified five times.

FIG. 5 illustrates the application of the invention to a tractor tire 20 having a sidewall 21 and tread 22. The tread has traction portions made up of lug elements 23 and 24. The lugs 23 and 24 are circumferentially spaced with valleys therebetween such that the valleys have cemented thereto or preferably molded therein sections of fin groups 25. FIG. 5 illustrates an enlarged cross-sectional view of the tractor tire, with the actual dimension of the fins being proportioned similarly to that described with respect to FIG. 3. In a test conducted with tractor tire, half of whose valleys were covered with sections of fin structures and the remaining half of the valleys being smooth or bare, it was shown that mud was built up in the bare valley portions of the tractor tire, whereas little or no build-up of mud occurred in the fin structured portions of the tire when such tire traversed a field of mud.

The build-up of mud on such smooth surface resulted in picking up of weeds, rocks, twigs with a packing down between the ribs or lugs of the tire, destroying traction. The invention contemplates the use of a resilient flat body (FIG. 5) which may be cemented to the valley of a tire between ribs 23—23 or cemented to the sole of a boot or shoe that is to be used in the environment of mud, but preferably vulcanized thereto to make an integral unit.

Another modification of the invention is shown in FIG. 6 wherein a boot 29 has a sole construction that is in two separate parts. The sole portion of such boot 29 hereinafter referring to that portion of the boot bottom that corresponds to the sole of a foot and the heel portion corresponds to the heel of a foot. Herein the sole portion 30 has the fins 31 identical in size and shape to the fins 13 of the first embodiment of FIG. 1; however, the fins slant downwardly and forwardly while the heel portion 32 has the fins 33 identical in size and shape to the fins 13 of the first embodiment of FIG. 1 and with the fins 33 slanting in the same direction as fins 13 but in opposite direction to that of fins 31 of the sole portion 30. The construction of such heel portion 32 and the sole portion 30 is such that the fins 31 and 33 cooperate to inhibit the build-up of mud to a significant degree.

Various modifications are contemplated and may obviously be resorted to by those skilled in the art without departing from the described invention, as hereinafter defined by the appended claims as only a preferred embodiment thereof has been disclosed.

I claim:

1. In a ground contacting element which covers substantially the entire bottom surface of a boot, overshoe, shoe or the like, a resilient body adapted to be fixedly secured to the base of an overshoe, said resilient body having a plurality of transversely extending flexible fins, said fins extending downwardly and rearwardly from said resilient body, each of said fins having a front and a rear face portion whose surfaces are parallel to each other and parallel to adjacent faces of adjacent fins, each of said fins being longitudinally extending and of uniform width for the entire length and height thereof, each fin having an adjacent fin defining a groove therebetween, each of said grooves is of uniform width for the entire length thereof, and each groove width is equal to said width of said fin.

2. In a ground contacting element as set forth in claim 1 wherein said surfaces of said fins make an angle of 45° with a horizontal plane.

3. In a ground contacting element as set forth in claim 1 wherein said width of said fins is in the range of 0.016 of an inch to a 0.25 of an inch.

4. In a ground contacting element as set forth in claim 3 wherein the ratio of the height of said fin is to the thickness of said fin is approximately 4.5 to 1.

5. In a ground contacting element as set forth in claim 1 wherein the width of said fins is approximately 0.035 of an inch.

6. An overshoe construction having an upper portion and a sole attached thereto, said upper having a toe portion and a heel portion, said sole having a resilient flat body integral with the base of said upper portion, said resilient body having a plurality of linear transversely extending thin flexible fins, said fins inclined downwardly at an acute angle along the entire length of said resilient body in a direction from said toe portion toward said heel portion, each of said fins having a front and rear surface, said surfaces being parallel to each other and parallel to adjacent surfaces of adjacent fins, each of said fins being of uniform width for the entire height thereof, and each fin cooperating with adjacent fins defining a groove therebetween, and said grooves have a width and depth that is equal to the thickness and height of said fins respectively.

7. In a ground contacting element for use in environments of mud and the like comprising a resilient flat body having a lower portion, a front edge portion and a back edge portion, said body having a plurality of spaced transversely extending flexible fins integral with said body, said fins extending downwardly and rearwardly at an acute angle from said lower portion, each of said fins having a front and rear surface, all of said surfaces being parallel to each other, and each of said fins being of uniform width in cross-section for the entire height thereof, adjacent fins define a longitudinally extending groove therebetween, and the width of each of said grooves being equal to the width of each of said fins.

8. In a ground contacting element as set forth in claim 7 wherein the width of said fins is approximately 0.035 of an inch.

* * * * *